United States Patent
Yoshitake et al.

(10) Patent No.: US 7,552,960 B2
(45) Date of Patent: Jun. 30, 2009

(54) WINDSCREEN UP-DOWN DEVICE AND MOTORCYCLE EQUIPPED THEREWITH

(75) Inventors: Hideto Yoshitake, Akashi (JP); Koichi Egami, Akashi (JP); Nobuyoshi Murata, Kawanishi (JP)

(73) Assignees: Kawasaki Jukogyo Kabushiki Kaisha, Kobe-Shi (JP); Hi-Lex Corporation, Takarazuka-Shi (JP)

( * ) Notice: Subject to any disclaimer, the term of this patent is extended or adjusted under 35 U.S.C. 154(b) by 0 days.

(21) Appl. No.: 12/005,661

(22) Filed: Dec. 26, 2007

(65) Prior Publication Data

US 2008/0197658 A1 Aug. 21, 2008

(30) Foreign Application Priority Data

Dec. 26, 2006 (JP) ............................. 2006-349332

(51) Int. Cl.
  *B62J 23/00* (2006.01)
(52) U.S. Cl. .................................... 296/78.1; 296/77.1
(58) Field of Classification Search ................. 296/78.1, 296/77.1, 84.1
See application file for complete search history.

(56) References Cited

U.S. PATENT DOCUMENTS

2003/0062740 A1* 4/2003 Takemura et al. .......... 296/78.1

FOREIGN PATENT DOCUMENTS

JP 2006-224908 8/2006

* cited by examiner

*Primary Examiner*—Joseph D Pape
(74) *Attorney, Agent, or Firm*—Alleman Hall McCoy Russell & Tuttle LLP

(57) ABSTRACT

A windscreen up-down device comprises a pair of right and left side rails disposed to extend in a forward direction and a rearward direction so as to be tilted downward in the forward direction, a center rail that is disposed between the side rails such that the center rail extends in the forward and rearward directions so as to be tilted downward in the forward direction, and a movable unit that is configured to be guided up and down along the side rails and the center rail, and is attached with a windscreen. The movable unit includes a pair of side slide members respectively guided along the side rails, a coupling member disposed to extend in a rightward direction and a leftward direction to couple the side slide members to each other, and a center slide member that is provided on the coupling member and is configured to be guided along the center rail. The side rails and the center rail have circular-arc shapes of substantially concentric circles as viewed from the side.

9 Claims, 8 Drawing Sheets

US 7,552,960 B2

WINDSCREEN UP-DOWN DEVICE AND MOTORCYCLE EQUIPPED THEREWITH

TECHNICAL FILED

The present invention relates to a windscreen up-down device for a vehicle configured to move up and down a windscreen such that an angle of the windscreen is changed according to the up and down movement.

BACKGROUND

For conventional motorcycles, a windscreen up-down device has been proposed, to enable a wind-shield windscreen disposed in front of a rider to move up and down (e.g., see Japanese Laid-Open Patent Application Publication No. 2006-224908). The windscreen up-down device includes a center rail provided to be tilted downward in a forward direction, side rails provided at both sides and at a rear side of the center rail to be tilted downward in the forward direction, a center slider guided slidably along the center rail, side sliders guided slidably along the side rails, a plate coupling the sliders to each other and supporting the windscreen, and a drive unit that causes the plate to move up and down. The rails are of a straight-line shape as viewed from the side. The center rail and the side rails are provided at different angles. The side rails are tilted upward with angles larger than that of the center rail from forward to rearward of a vehicle body of the motorcycle. A rotation mechanism is mounted between the plate and the sliders to be rotatable around an axis extending rightward and leftward.

In accordance with the windscreen up-down device, the drive unit causes the windscreen to move up along the rails so as to rise up while increasing its angle. To be specific, since the side rails are tilted upward in a rearward direction with angles larger than that of the center rail, the windscreen is guided so as to rise up smoothly while absorbing an angle difference between the center rail and the side rails by the rotation mechanism.

However, in the above windscreen up-down device, since the angle of the windscreen is changed according to the up and down movement of the windscreen, the rotation mechanism is needed to absorb the angle difference between the center rail and the side rails. For this reason, a structure of the windscreen up-down device becomes intricate, and the number of components or manufacturing costs may be increased, in contrast to a windscreen up-down device for moving up and down the windscreen without changing its angle.

SUMMARY OF THE INVENTION

The present invention addresses the above described conditions, and an object of the present invention is to provide a windscreen up-down device configured to move up and down a windscreen such that an angle of the windscreen is changed according to the up and down movement, with a simple configuration.

According to the present invention, there is provided a windscreen up-down device comprising a pair of right and left side rails disposed to extend in a forward and rearward direction so as to be tilted downward in the forward direction, a center rail that is disposed between the side rails such that the center rail extends in the forward and rearward directions so as to be tilted downward in the forward direction, and a movable unit that is configured to be guided up and down along the side rails and the center rail, and is attached with a windscreen, wherein the movable unit includes a pair of side slide members respectively guided along the side rails; a coupling member disposed to extend in a rightward direction and a leftward direction to couple the side slide members to each other; and a center slide member that is provided on the coupling member and is configured to be guided along the center rail, wherein the side rails and the center rail have circular-arc shapes of substantially concentric circles as viewed from the side.

In such a configuration, since the side rails and the center rail are circular-arc shaped as viewed from the side, and the movable unit is guided in a circular-arc shape along the rails by the side slide members and the center slide member, an angle of the windscreen attached to the movable unit is changed according to up and down movement. Since the side rails and the center rail are curved to form the circular-arc shapes of the substantially concentric circles, the movable unit changes its angle smoothly without providing a rotation mechanism between the slide members and the coupling member. Therefore, a structure of the windscreen up-down device can be simplified, and the number of components and the cost of the windscreen up-down device can be reduced.

One of the side rails and the center rail may be disposed closer to a concentricity of the concentric circles respectively corresponding to the side rails and the center rail than the other. A curvature radius of the circular-arc of one of the side rails and the center rail may be smaller than a curvature radius of the circular-arc of the other.

In such a configuration, since a distance between the concentricity and the center rail can be made different from a distance between the concentricity and the side rails without providing the rotation mechanism between the slide members and the coupling member, the rails can be arranged flexibility in a simple structure.

The side rails and the center rail may be curved to protrude downward as viewed from the side.

In such a configuration, since the rails are shaped to protrude downward as viewed from the side such that their rear portions are tilted upward in a rearward direction, the windscreen rises up so as to increase an angle with respect to a horizontal direction while moving upward, while it is lowered so as to decrease the angle while moving downward. Therefore, when the motorcycle is traveling at a high speed, the windscreen is moved up to enable the rider to effectively avoid wind blowing from the front of the motorcycle, while when the motorcycle is traveling at a low speed, the windscreen is lowered to effectively reduce a resistance to the wind blowing on the front of the motorcycle.

The center rail may be plate-shaped and the center slide member may be configured to slidably retain the center rail. The center slide member may be integral with the coupling member.

In such a configuration, since the plate-shaped center rail is retained by the center slide member, it becomes possible to effectively reduce a space occupied by the center rail and the center slide member in a center section where other components of the windscreen up-down device are arranged, and thus the windscreen device can be small-sized. Since the center slide member is formed integrally with the coupling member, the number of components and the number of manufacturing steps of the windscreen up-down device can be reduced.

The coupling member and the center slide member may be a unitary component formed integrally by die casting.

Thereby, the number of components of the movable unit and the number of manufacturing steps of the movable unit can be reduced. In addition, the coupling member and the center slide member can be manufactured with high precision to reduce dimension errors and to smooth up-down movement of the movable unit.

The windscreen up-down device may further comprise a bushing separably attached on a sliding surface of the center slide member that is opposite to the center rail.

Since the bushing is changed by separating only the bushing from the center slide member in maintenance of the windscreen up-down device, maintenance costs can be reduced.

The coupling member of the movable unit may be circular-arc shaped such that a center portion in the rightward and leftward directions protrudes in a travel direction of a vehicle equipped with the windscreen up-down device.

In such a configuration, since the coupling member is formed to protrude in the circular-arc shape in the travel direction, stiffness of the coupling member with respect to the blowing wind transmitted via the windscreen can be increased. Moreover, other components can be efficiently arranged in a space below the coupling member, thus improving space efficiency.

The windscreen up-down device may further comprise cables coupled to the movable unit so as to respectively correspond to the side rails, and a drive unit configured to cause the cables to be extended and retracted. The cables may be installed in a criss-cross shape as viewed from above.

In such a configuration, since the cables are installed in the criss-cross shape, when an upward load is applied from the cable to a portion of the movable unit corresponding to the right side rail, it is also applied from the cable to a portion of the movable unit corresponding to the left side rail in the same manner, causing the movable unit to move up. Likewise, the movable unit is moved down by a downward load applied from the cables. Thus, the load applied to the movable unit can be well-balanced in the rightward and leftward directions, and as a result, the movable unit can be moved up and down stably.

According to another aspect of the present invention, there is provided a motorcycle comprising the above described windscreen up-down device.

Since a structure of the windscreen up-down device can be simplified as described above, a simple and inexpensive motorcycle can be achieved The above and further objects and features of the invention will more fully be apparent from the following detailed description with reference to the accompanying drawings.

DETAILED DESCRIPTION OF THE PREFERRED EMBODIMENTS

Figure 1:
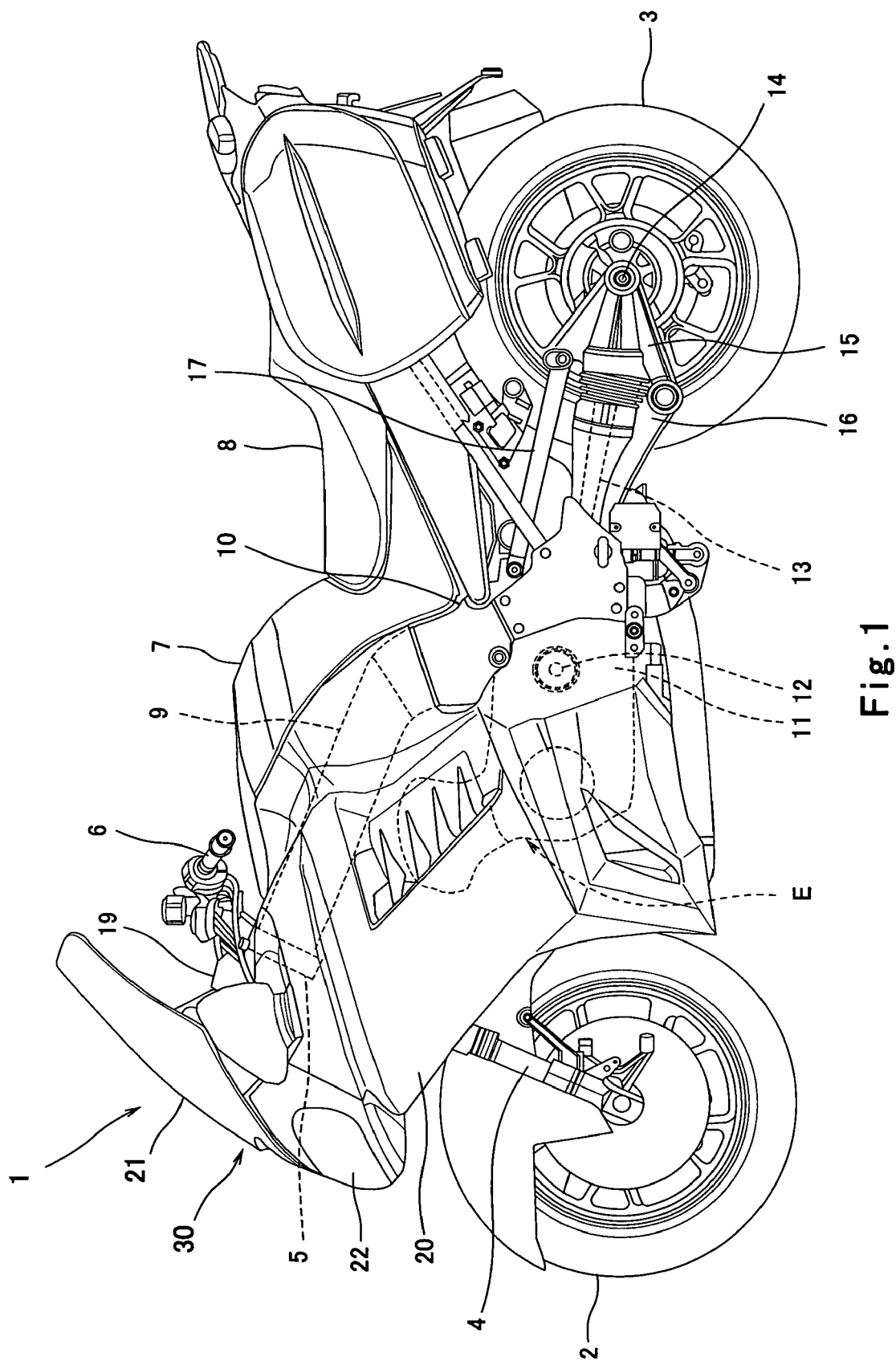
FIG. 1 is a left side view of a motorcycle according to an embodiment of the present invention.

Hereinafter, an embodiment of the present invention will be described with reference to the accompanying drawings. FIG. 1 is a left side view of a motorcycle 1 according to the embodiment of the present invention. Herein, directions are generally referenced from the perspective of a rider mounting the motorcycle 1.

Turning now to FIG. 1, the motorcycle 1 includes a front wheel 2 and a rear wheel 3. The front wheel 2 is rotatably mounted to a lower end portion of a front fork 4 extending substantially vertically. The front fork 4 is mounted on a steering shaft (not shown) by an upper bracket (not shown) attached to an upper end thereof, and an under bracket (not shown) located under the upper bracket. The steering shaft is rotatably supported by a head pipe 5. A bar-type steering handle 6 extending rightward and leftward is attached to the upper bracket. When the rider rotates the steering handle 6 clockwise or counterclockwise, the front wheel 2 is turned to a desired direction around the steering shaft 6. A fuel tank 7 is disposed behind the steering shaft 6. A straddle-type seat 8 is disposed behind the fuel tank 7.

A main frame member 9 extends rearward from the head pipe 5 and is tilted slightly downward. A pivot frame member 10 is coupled to a rear portion of the main frame member 9. Between the front wheel 2 and the rear wheel 3, the engine E is mounted on the main frame member 9 and the pivot frame member 10. A transmission 11 is integrally mounted to the engine E. A drive shaft 13 is coupled at a front end portion thereof to an output shaft 12 of the transmission 11 via a bevel gear (not shown), and at a rear end portion thereof to a rear gear case 15 coupled to an axle 14 of the rear wheel 3. Between the pivot frame member 10 and the rear gear case 15, a swing arm 16 and a torque rod 17 are disposed to extend substantially in parallel in upper and lower positions.

A meter device 19 is provided in front of the handle 6 to display a travel speed of the motorcycle 1, an engine speed of an engine E, etc. A cowling 20 is provided to extend from a front portion of a vehicle body to side portions of the vehicle body so as to cover the engine E and other components. Continuously with the cowling 20, a headlight 22 is mounted at a front portion of the vehicle body. A windscreen 21, which is formed of a transparent resin plate, is disposed above the headlight 22 to protect the rider from a wind blowing from forward. The windscreen 21 is electrically driven to move up and down by a windscreen up-down device 30 disposed forward of the meter device 19.

Figure 2:
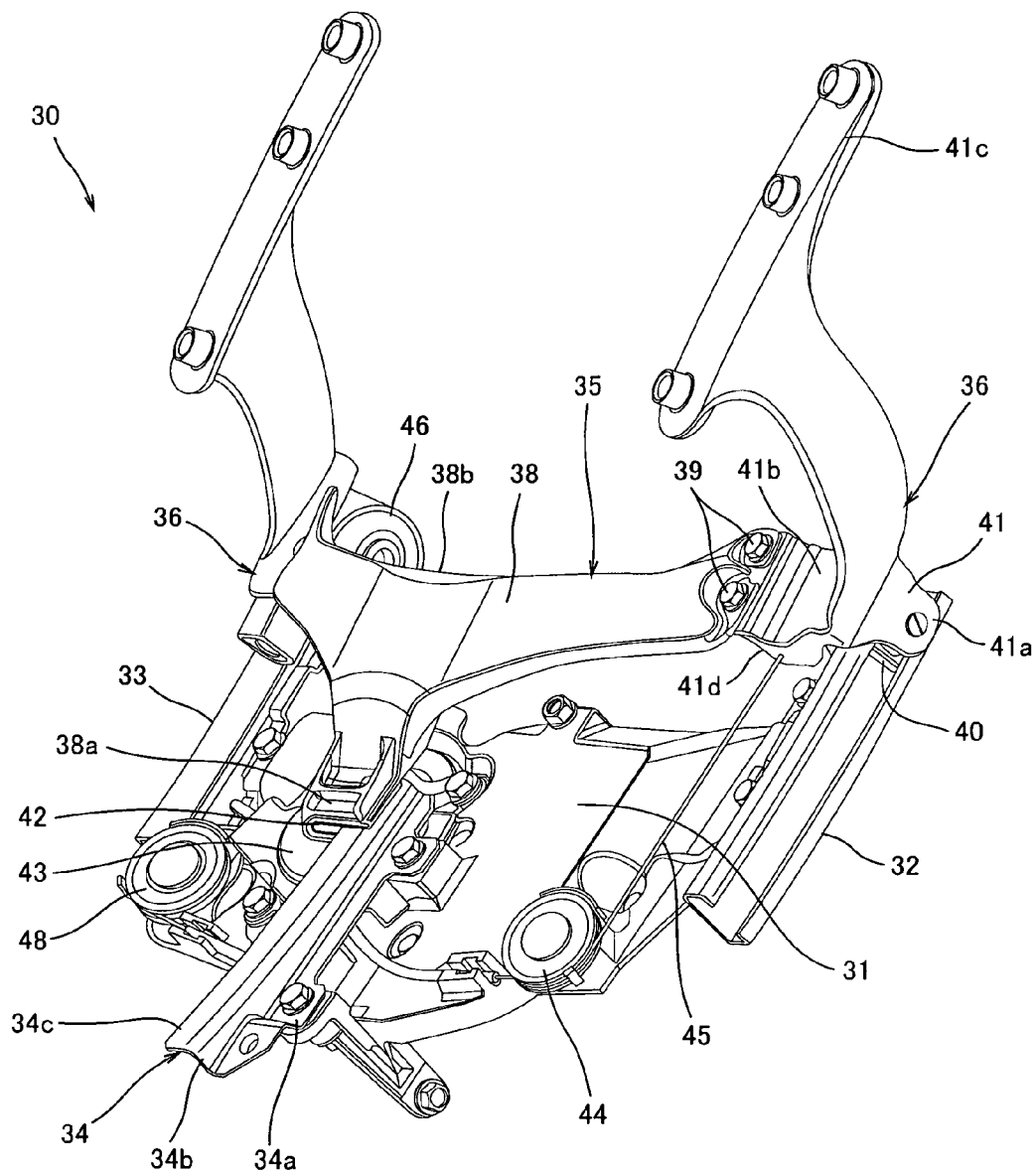
FIG. 2 is a perspective view of a windscreen up-down device mounted in the motorcycle of FIG. 1.
Figure 3:
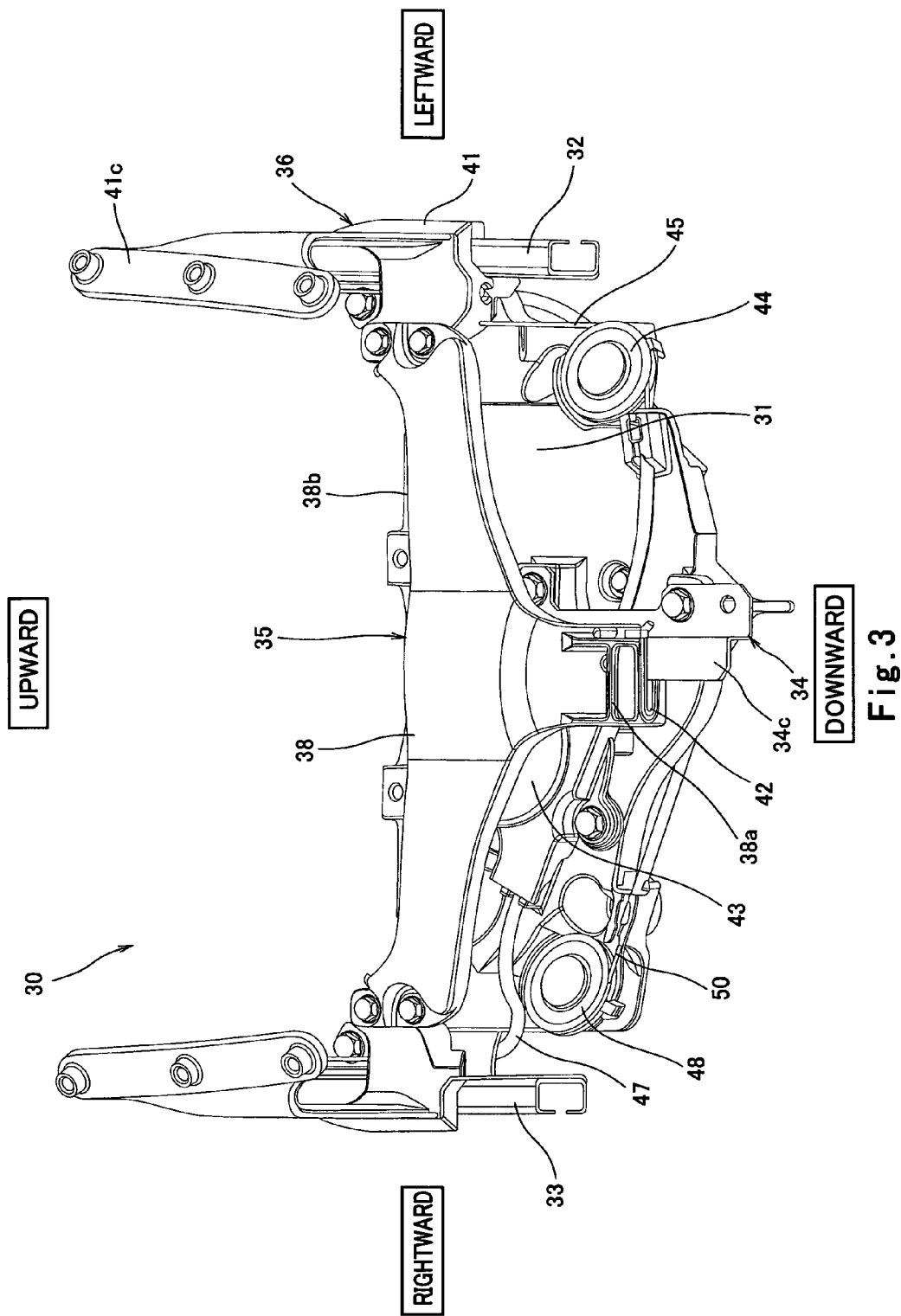
FIG. 3 is a front view of the windscreen up-down device of FIG. 2.
Figure 4:
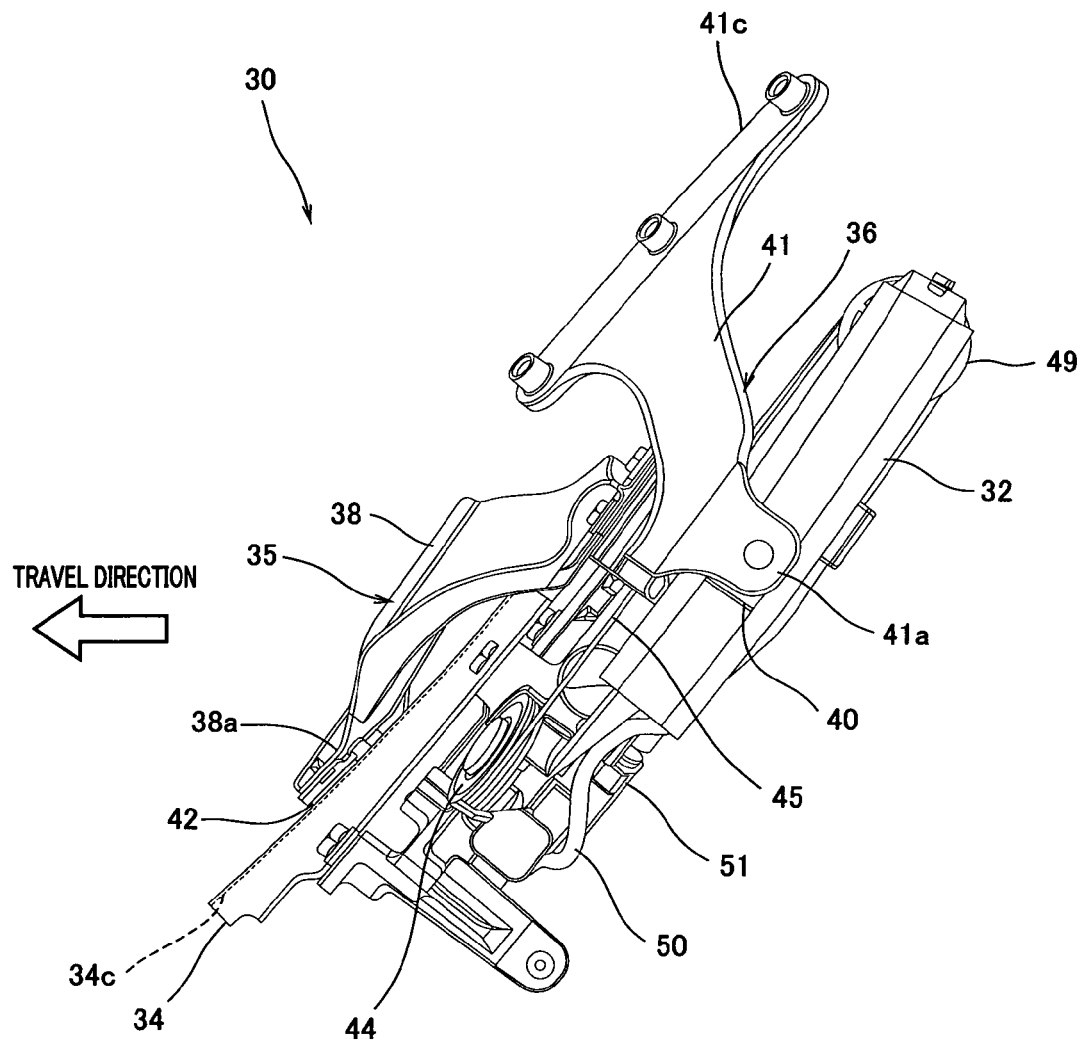
FIG. 4 is a left side view of the windscreen up-down device of FIG. 2.

FIG. 2 is a perspective view of the windscreen up-down device 30 mounted in the motorcycle 1 of FIG. 1. FIG. 3 is a front view of the windscreen up-down device 30 of FIG. 2. FIG. 4 is a left side view of the windscreen up-down device 30 of FIG. 2. With reference to FIGS. 2, 3, and 4, the windscreen up-down device 30 will be described in detail. As shown in FIG. 2, the windscreen up-down device 30 includes a base plate 31 that is coupled to a vehicle body frame of the motorcycle 1 so as to be tilted downward in the forward direction. A pair of right and left side rails 32 and 33 are fixed to rear portions on right and left sides of the base plate 31 so as to extend in a longitudinal direction of the vehicle body and to be tilted downward in the forward direction: The side rails 32 and 33 are formed by press-forming a metal plate in C-shape in cross-section. An inner space of each of the side rails 32 and 33 serves as a guide rail.

A center rail 34 is disposed between the side rails 32 and 33 and is fixed to a front portion in a center section in a rightward direction and a leftward direction of the base plate 31. The center rail 34 extends in the forward and rearward directions, i.e., in the longitudinal direction of the vehicle body so as to be tilted downward in the forward direction. The center rail 34 is formed by press-forming a metal plate to have a stepped-shape in the rightward and leftward direction. The center rail 34 includes a first horizontal portion 34a which is a lower horizontal portion, a vertical portion 34b extending upward from a right end portion of the first horizontal portion 34a, and a second horizontal portion 34c protruding to the right from an upper end portion of the vertical portion 34b. The second horizontal portion 34c serves as a guide rail. A movable unit 35, to which the windscreen 21 (see FIG. 1) is mounted, is guided up and down along the side rails 32 and 33, and the center rail 34.

The movable unit 35 includes a pair of side slide members 36 guided along the side rails 32 and 33, respectively, a coupling member 38 disposed to extend in the rightward and leftward directions to connect the side slide members 36, and a center slide member 38a that is formed integrally at a front portion of the coupling member 38 and is configured to be guided along the center rail 34.

Since the right and left side slide members 36 are symmetric in the rightward and leftward directions and have the same structure, the left side slide member 36 will be in large part described. The side slide member 36 includes a rectangular-parallelepiped slider 40 which is in slidable contact with an inner peripheral surface of the side rail 32, and a support member 41 configured to fixedly couple the slider 40 to the coupling member 38. In this construction, the slider 40 is movable in surface contact within the side rail 23 without rotating. The support member 41 includes a vertical portion 41a fixed to an outer side surface of the slider 40, a horizontal portion 41b that protrudes from an upper end portion of the vertical portion 41a toward a center and is fixed to a left end portion of the coupling member 38 by bolts 39, a windscreen mounting portion 41c protruding upward from the horizontal portion 41b, and a cable mounting portion 41d which is provided on a lower surface side of the horizontal portion 41b and is coupled to end portions of cables 45 and 50 (see FIG. 6). The windscreen 21 (see FIG. 7) is retained between the windscreen mounting portion 41c and a press member 52 (see FIG. 7).

As shown in FIGS. 2 and 4, the coupling member 38 is formed in a circular-arc shape (arch-shape) in such a manner that a center portion in the rightward and leftward directions protrudes in a travel direction of the motorcycle 1. As shown in FIGS. 2 to 4, an upper edge 38b (rear edge) of the coupling member 38 has a concave shape recessed forward in a sliding direction. This makes it possible to inhibit the coupling member 38 from contacting the meter device 19 (see FIG. 1) when the movable unit 35 is moved up.

As shown in FIGS. 2 and 3, the center slide member 38a is substantially U-shaped in cross-section to slidably retain the second horizontal portion 34c of the center rail 34 from above and below. The center slide member 38a is integrally formed with the coupling member 38 by die casting using light metal such as aluminum. A separable bushing 42, which is made of resin or the like and is substantially U-shaped in cross-section, is separably attached on an inner surface, namely, a sliding surface, of the center slide member 38a.

A rotation drum unit 43 is mounted at a region slightly rightward relative to a center of the base plate 31. One end portion of the first cable 45 and a second cable 47 (see FIG. 6), which will be described in detail below, are coupled to the rotation drum unit 43. As shown in FIG. 4, a motor 51 is mounted to a rear surface of the base plate 31. The motor 51 is a power unit configured to cause the rotation drum unit 43 to rotate clockwise and counterclockwise. As shown in FIGS. 2 and 3, pulleys 44 and 48 are attached to front portions on left and right sides of the base plate 31 to guide the first cable 45 and a third cable 50, respectively. As shown in FIGS. 2 and 4, pulleys 46 and 49 are attached to side surfaces of rear portions of the side rails 33 and 32 to guide the second and third cables 47 and 50, respectively (see FIG. 6). As shown in FIG. 4, the cable 50 extends through a lower surface side of the base plate 31.

Figure 5:
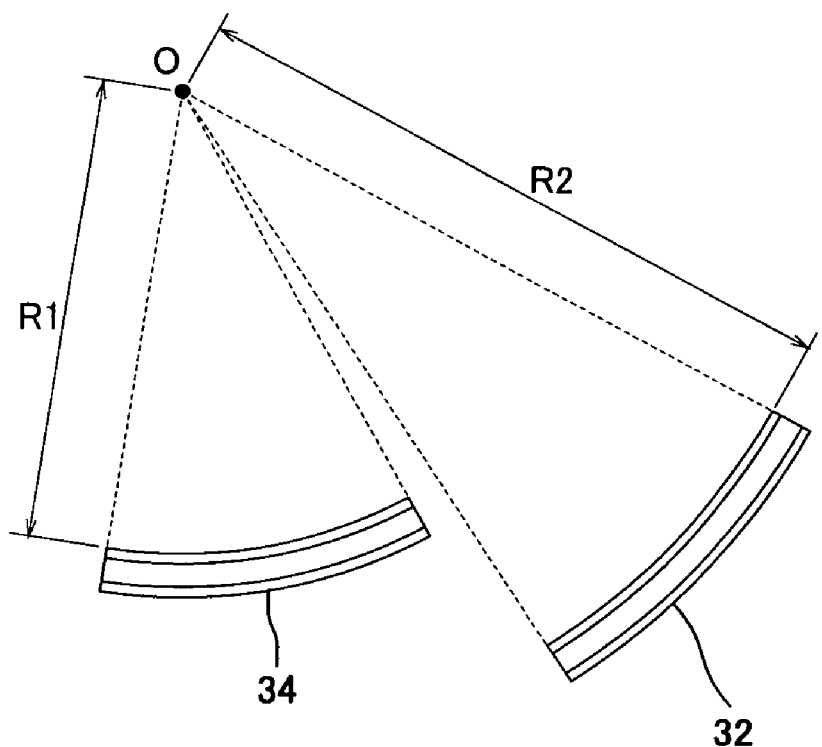
FIG. 5 is a side view schematically showing a center rail and a side rail of the windscreen up-down device of FIG. 2.

FIG. 5 is a side view schematically showing the center rail 34 and the side rail 32 of the windscreen up-down device 30 of FIG. 2. As shown in FIG. 5, the side rail 32 and the center rail 34 are curved such that their rear portions are tilted upward in a rearward direction. That is, the side rail 32 and the center rail 34 have circular-arc shapes to protrude downward as viewed from the side. The circular-arc shapes of the side rail 32 and the center rail 34 are part of substantially concentric circles as viewed from the side. The center rail 34 is positioned closer to a concentricity o than the side rail 32. A curvature radius R1 of the circular-arc of the center rail 34 is smaller than a curvature radius R2 of the circular-arc of the side rail 32.

Figure 6:
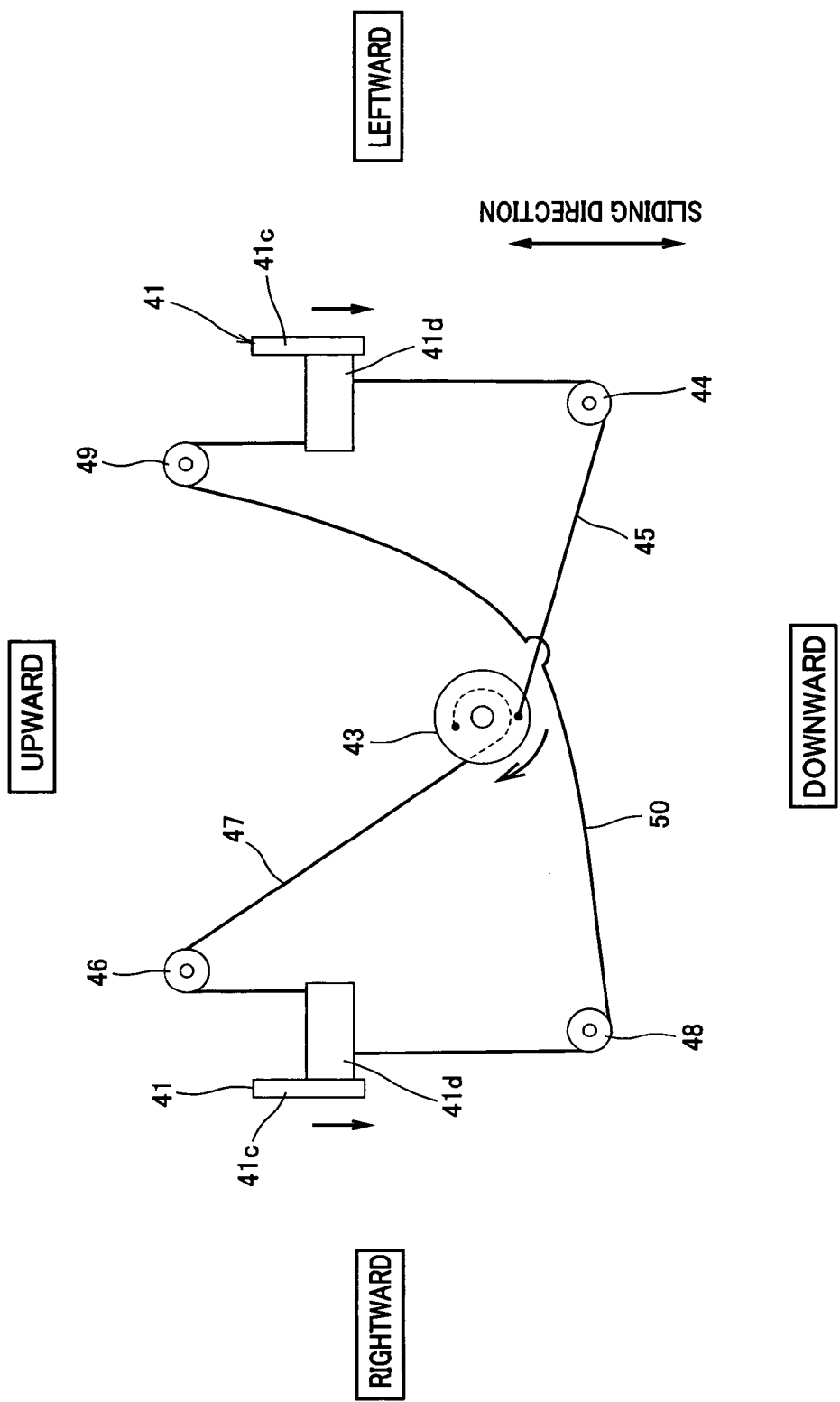
FIG. 6 is a plan view schematically showing cables of the windscreen up-down device of FIG. 2.

FIG. 6 is a plan view schematically showing cables of the windscreen up-down device 30 of FIG. 2. With reference to FIGS. 2 and 4, the cables and the associated components will be described. As shown in FIG. 6, the first cable 45 and the second cable 47 are wound around the rotation drum unit 43 in such a manner that one end portion of the first cable 45 and the second cable 47 are coupled to the rotation drum unit 43, and the first cable 45 and the second cable 47 are wound in opposite directions. The first cable 45 extends through the left front pulley 44, and further extends upward in the sliding direction. An opposite end portion of the first cable 45 is coupled to the cable mounting portion 41d of the left side slide member 36 (see FIG. 2). The second cable 47 extends through the pulley 46 attached to the right side rail 33 (see FIG. 2), and further extends downward in the sliding direction. An opposite end portion of the second cable 47 is coupled to the cable mounting portion 41d of the right side slide member 36 (see FIG. 2).

The third cable 50 is coupled at one end portion to the cable mounting portion 41d of the right side slide member 36 (see FIG. 2). The third cable 50 extends through the right front pulley 48 and further extends obliquely leftward and through the pulley 49 attached to the left side rail 32 (see FIG. 2). Then, the third cable 50 extends downward in the sliding direction, and an opposite end portion of the third cable 50 is coupled to the cable mounting portion 41d of the left side slide member 36 (see FIG. 2). As a whole, the first to third cables 45, 47, and 50 are installed in a cross-multiplication shape as viewed from above.

With reference to FIG. 6, how a driving power is transmitted from the rotation drum unit 43 to the side slide member 36 (see FIG. 2) will be described. When a motor 51 (see FIG. 4) rotates the rotation drum unit 43 clockwise, the first cable 45 is rolled up and thereby, the left side slide member 36 (see FIG. 2) is subjected to a load for causing the left side slide member 36 to move down. In this position, the load for causing the left side slide member 36 to move down is transmitted with an equal magnitude to the right side slide member 36 (see FIG. 2) via the third cable 50. Thereby, the rotation drum unit 43 rotates clockwise, causing the second cable 47 to be rolled out. The second cable 47 moves along with the down movement of the right side slide member 36 (see FIG. 2).

Figure 7:
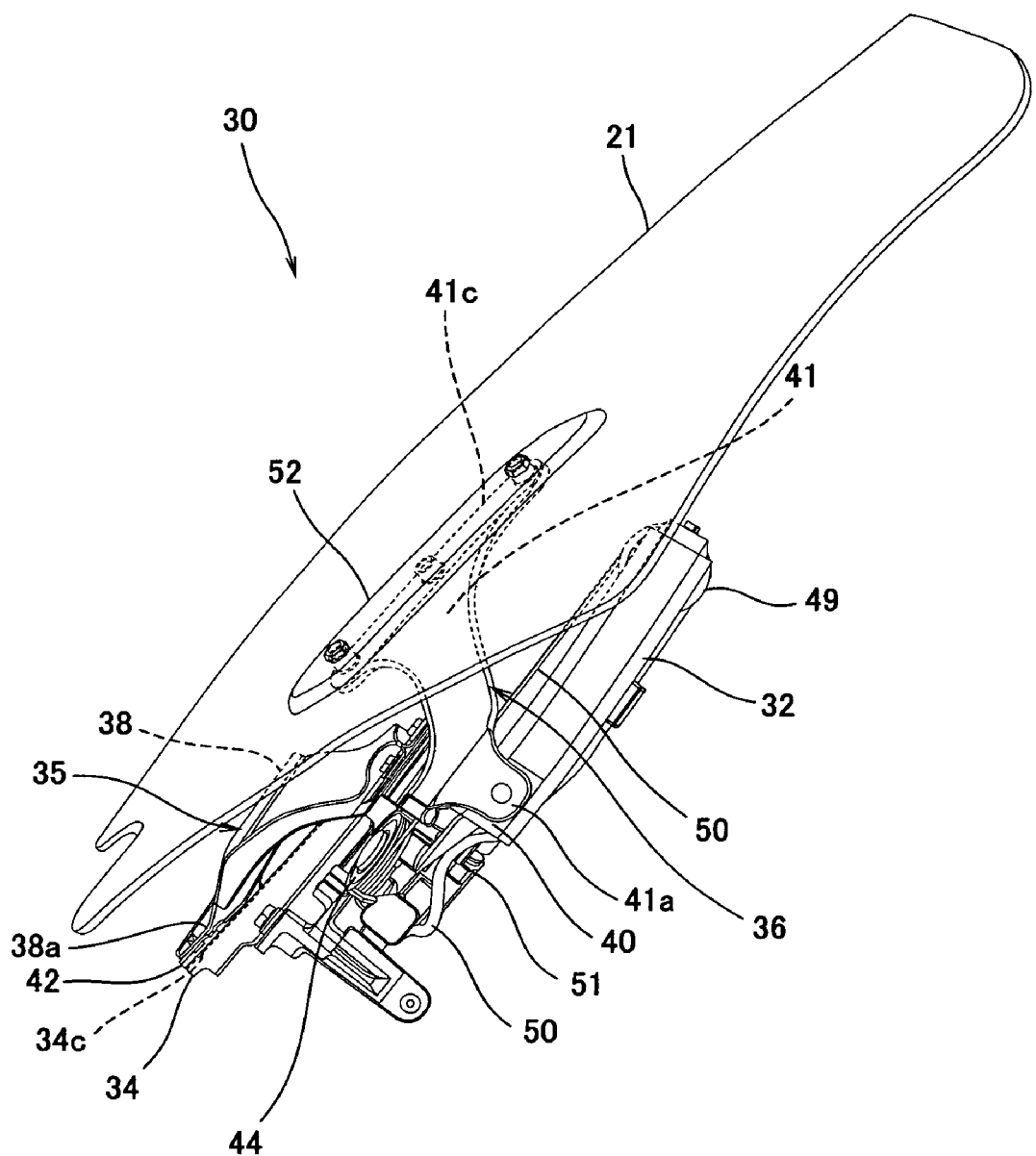
FIG. 7 is a left side view of the windscreen up-down device of FIG. 2 in a down position.
Figure 8:
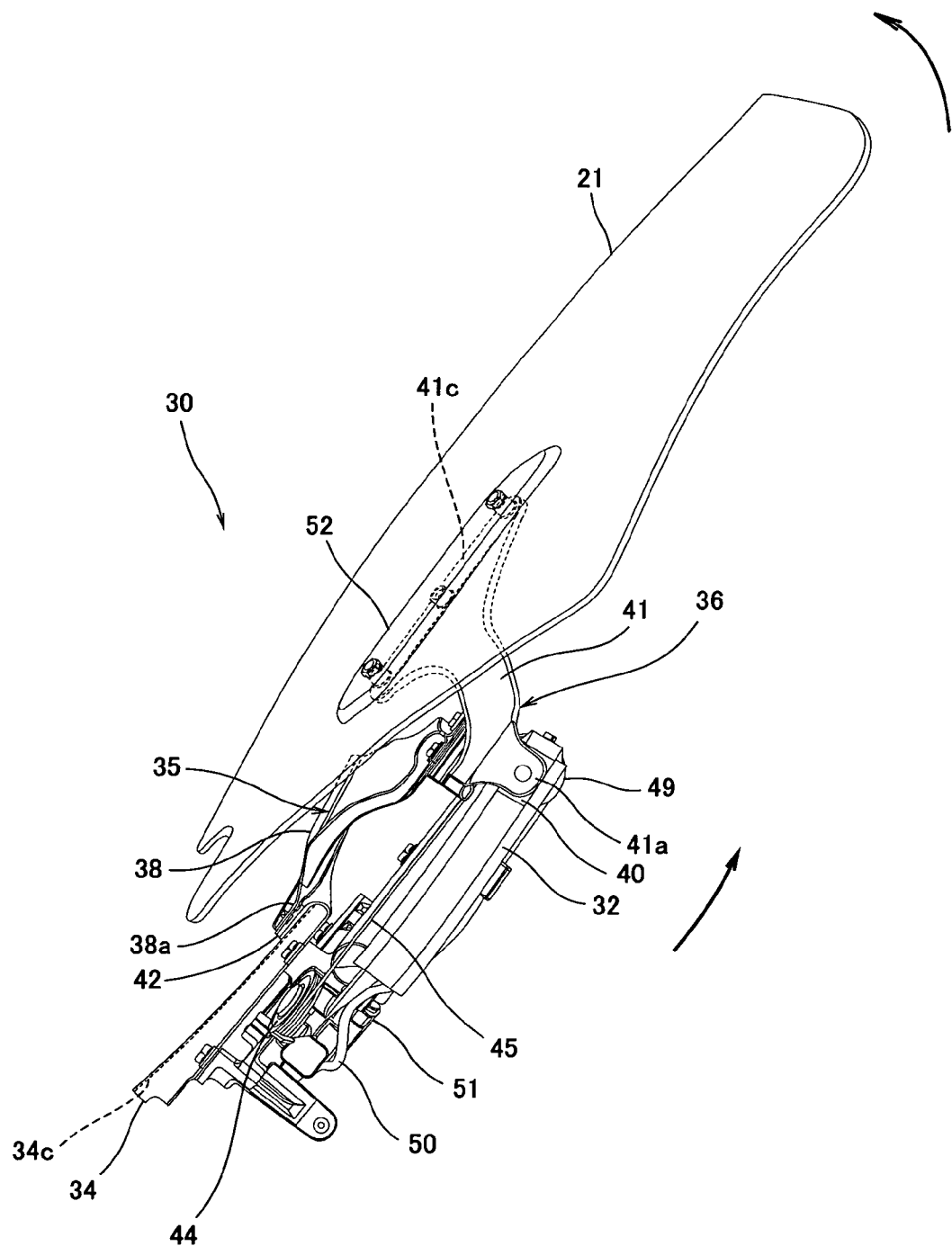
FIG. 8 is a left side view of the windscreen up-down device of FIG. 2 in an up position.

An operation of the windscreen up-down device 30 is described below. FIG. 7 is a left side view of the windscreen up-down device 30 of FIG. 2 in a down position. FIG. 8 is a left side view of the windscreen up-down device 30 of FIG. 2 in an up position. As shown in FIG. 7, the side rails 32 and 33 (see FIG. 2), and the center rail 34 are curved such that their rear portions are tilted upward in the rearward direction. Therefore, the windscreen 21 is in the down position with a small angle with respect to a horizontal direction. When the motorcycle 1 is traveling at a low speed, the windscreen 21 is lowered to effectively reduce a resistance to a wind blowing on the front of the motorcycle.

When the rotation drum unit 43 (see FIG. 2) is rotated counterclockwise (see FIG. 6) in the state shown in FIG. 7 to cause the first to third cables 45, 47, and 50 (see FIG. 6) to be extended and retracted, side slide members 36 and the center slide member 38a are moved up along the side rails 32 and 33 (see FIG. 2), and the center rail 34. Since the side rails 32 and 33 (see FIG. 2) and the center rail 34 are provided substantially concentrically as viewed from the side, the movable unit 35 attached with the windscreen 21 changes its angle to a state shown in FIG. 8 without providing a rotation mechanism between the slide members 36 and the coupling member 38.

Since the first to third cables 45, 47, and 50 (see FIG. 6) are provided in the criss-cross shape as described above, the load is transmitted uniformly in the same direction to the right and left side slide members 36, enabling the movable unit 35 to be moved up stably and smoothly to the state shown in FIG. 8. As shown in FIG. 8, since the side rails 32 and 33 (see FIG. 2), and the center rail 34 are curved such that their rear portions are tilted upward in the rearward direction, the windscreen 21 rises up with a large angle with respect to a horizontal direction in the up movement. Therefore, when the motorcycle 1 is traveling at a high speed, the windscreen 21 is caused to be moved up so as to rise up, to enable the rider to effectively avoid the wind blowing from the front of the motorcycle.

In the above configuration, since the side rails 32 and 33 (see FIG. 2) and the center rail 34 are curved concentrically as viewed from the side, the windscreen 21 is able to change its angle smoothly according to the up movement and the down movement without providing the rotation mechanism between the slide members 36 and the coupling member 38. Therefore, a structure of the windscreen up-down device 30 can be simplified, and the number of components and a cost of the windscreen up-down device 30 can be reduced.

Since the distance (curvature radius) R1 between the concentricity o (see FIG. 5) and the center rail 34 is made different from the distance (curvature radius) R2 between the concentricity o and the side rails 32 and 33 without providing the rotation mechanism between the slide member 36 and the coupling member 38, the rails 32, 33, and 34 can be arranged flexibly. So, the components of the windscreen up-down device 30 can be arranged close to each other, and thus, the windscreen up-down device 30 can be small-sized.

Since the plate-shaped center rail 34 is retained by the center slide member 38a, it becomes possible to effectively reduce a space occupied by the center rail 34 and the center slide member 38a in a center section where other components of the windscreen up-down device 30 are arranged, and thus the windscreen device 30 can be thinned. Since the center slide member 38a is formed integrally with the coupling member 38 by die casting, the number of components and the number of manufacturing steps can be reduced. In addition, the coupling member 38 and the center slide member 38a can be manufactured with high precision to reduce dimension errors and to smooth up-down movement of the movable unit 35.

The bushing 42 is separably attached to the sliding surface of the center slide member 38a. In maintenance of the windscreen up-down device 30, maintenance of the center slide member 38a is accomplished by changing only the bushing 42 separable from the center slide member 38a. As a result, maintenance costs can be reduced. Furthermore, the coupling member 38 of the movable unit 35 is circular-arc shaped such that the center portion in the rightward and leftward directions protrudes in the travel direction for the purpose of increasing stiffness of the coupling member 38 with respect to the wind transmitted via the windscreen 21. Moreover, other components can be efficiently arranged in a space under the coupling member 38. Thus, space efficiency is improved.

Whereas in the above described embodiment, the curvature radius R1 of the circular-arc of the center rail 34 is formed to be smaller than the curvature radius R2 of the circular-arc of the side rail 32, the curvature radius R1 may be formed to be larger than or equal to the curvature radius R2 of the circular-arc of the side rail 32. Whereas in the above described embodiment, the center rail 34 is a single rail, a plurality of center rails, for example two, may alternatively be provided. Whereas in the above described embodiment, the motorcycle 1 has been illustrated, the present invention is applicable to personal watercraft (PWC) or four-wheeled vehicles such as ATVs.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A windscreen up-down device comprising:
    a pair of right and left side rails disposed to extend in a forward direction and a rearward direction so as to be tilted downward in the forward direction;
    a center rail that is disposed between the side rails such that the center rail extends in the forward and rearward directions so as to be tilted downward in the forward direction; and
    a movable unit that is configured to be guided up and down along the side rails and the center rail, and is attached with a windscreen;
    wherein the movable unit includes:
        a pair of side slide members respectively guided along the side rails;
        a coupling member disposed to extend in a rightward direction and a leftward direction to couple the side slide members to each other; and
        a center slide member that is provided on the coupling member and is configured to be guided along the center rail;
    wherein the side rails and the center rail have circular-arc shapes of substantially concentric circles as viewed from the side.

2. The windscreen up-down device according to claim 1, wherein
    one of the side rails and the center rail is disposed closer to a concentricity of the concentric circles respectively corresponding to the side rails and the center rail than the other; and wherein
    a curvature radius of the circular-arc of one of the side rails and the center rail is smaller than a curvature radius of the circular-arc of the other.

3. The windscreen up-down device according to claim 1, wherein the side rails and the center rail are curved to protrude downward as viewed from the side.

4. The windscreen up-down device according to claim 1, wherein the center rail is plate-shaped and the center slide member is configured to slidably retain the center rail; and wherein the center slide member is integral with the coupling member.

5. The windscreen up-down device according to claim 4, wherein the coupling member and the center slide member are a unitary component formed integrally by die casting.

6. The windscreen up-down device according to claim 5, further comprising:
a bushing separably attached on a sliding surface of the center slide member that is opposite to the center rail.

7. The windscreen up-down device according to claim 1, wherein the coupling member of the movable unit is circular-arc shaped such that a center portion in the rightward and leftward directions protrudes in a travel direction of a vehicle equipped with the windscreen up-down device.

8. The windscreen up-down device according to claim 1, further comprising:
cables coupled to the movable unit so as to respectively correspond to the side rails; and
a drive unit configured to cause the cables to be extended and retracted;
wherein the cables are installed in a criss-cross shape as viewed from above.

9. A motorcycle comprising a windscreen up-down device, the windscreen up-down device including:
a pair of right and left side rails disposed to extend in a forward direction and a rearward direction so as to be tilted downward in the forward direction;
a center rail that is disposed between the side rails such that the center rail extends in the forward and rearward directions so as to be tilted downward in the forward direction; and
a movable unit that is configured to be guided up and down along the side rails and the center rail, and is attached with a windscreen;
wherein the movable unit includes:
a pair of side slide members respectively guided along the side rails;
a coupling member disposed to extend in a rightward direction and a leftward direction to couple the side slide members to each other; and
a center slide member that is provided at the coupling member and is configured to be guided along the center rail;
wherein the side rails and the center rail have circular-arc shapes of substantially concentric circles as viewed from the side.

* * * * *